United States Patent [19]

Nilssen

[11] Patent Number: 4,926,096

[45] Date of Patent: May 15, 1990

[54] SHOCK-PROTECTED ELECTRONIC BALLAST

[76] Inventor: Ole K. Nilssen, Caesar Dr., Rte. 5, Barrington, Ill. 60010

[21] Appl. No.: 830,270

[22] Filed: Feb. 18, 1986

[51] Int. Cl.$^5$ .............................................. H05B 37/00
[52] U.S. Cl. ............................... 315/225; 315/DIG. 5
[58] Field of Search ............... 315/205, 224, 307, 308, 315/DIG. 5, DIG. 7, 225

[56] References Cited

U.S. PATENT DOCUMENTS

| | | | |
|---|---|---|---|
| 4,438,372 | 3/1984 | Zuchtriegel | 315/224 |
| 4,461,980 | 7/1984 | Nilssen | 315/DIG. 7 |
| 4,554,487 | 11/1985 | Nilssen | 315/224 |
| 4,613,934 | 9/1986 | Pacholok | 315/DIG. 7 |
| 4,638,395 | 1/1987 | Nilssen | 315/DIG. 7 |

Primary Examiner—Eugene R. LaRoche

[57] ABSTRACT

An electronic ballast provides a high-frequency current-limited voltage between a first socket terminal and a second socket terminal. These socket terminals are adapted to receive and hold a rapid-start fluorescent lamp. The first terminal has a relatively low-magnitude potential with respect to ground; the second terminal has a relatively high-magnitude potential with respect to ground. A person coming in direct or indirect contact with the second terminal is apt to receive a hazardous electric shock. A self-oscillating electronic inverter is operable to provide the high-frequency voltage. To provide an output, this inverter has to be triggered into oscillation. However, if no current flows from the first terminal, the inverter will automatically become disabled with 25 milli-seconds; whereafter it will not be re-triggered for about 1.5 seconds. With no current flowing, the magnitude of the high-frequency AC voltage is high enough to permit proper starting of the rapid-start fluorescent lamp within a time span of 25 milli-seconds, but only after its cathodes have become incandescent. As soon as the lamp has started, lamp current flows from the socket terminals and through the fluorescent lamp. If lamp current flowing from the first terminal fails to materialize, or if interrupted, as for instance may happen when replacing the fluorescent lamp, the inverter becomes disabled; which means that the electric shock hazard represented by the second terminal will be removed within 25 milli-seconds.

28 Claims, 1 Drawing Sheet

SHOCK-PROTECTED ELECTRONIC BALLAST

BACKGROUND OF THE INVENTION

1. Field of Invention

The present invention relates to fluorescent lamp ballasts, particularly of a type providing protection from electric shock hazard to a person servicing lighting fixtures in which such ballasts are used.

2. Prior Art

In electronic fluorescent lamp ballasts of prior art, electric shock protection is generally accomplished by powering the fluorescent lamps by way of an isolation transformer. However, there are several drawbacks associated with the use of an isolation transformer: (i) substantial additional cost, (ii) significantly added weight and volume, and (iii) sizable reduction in overall efficiency.

Another approach to providing electric shock hazard protection is that of reducing the magnitude of the ballast output voltage in case the lamp is removed from its output. Such an approach is described in U.S. Pat. No. 4,461,980 to Nilssen. However, the particular method described by Nilssen in that patent does not provide protection in a situation where a person may be in contact between ground and the "hot" side of the ballast output, and if that person should then happen to draw enough current from that "hot" side to provide significant loading of the ballast output.

Still another approach to providing electric shock hazard protection is that of reducing the magnitude of the ballast output voltage in case a ground-fault current occurs. This approach is described in U.S. Pat. No. 4,507,698 to Nilssen. However, while this approach is indeed fully operable and does indeed significantly mitigate the several drawbacks associated with the use of an isolation transformer, there are complexities involved with accurately and inexpensively sensing the ground-fault current.

SUMMARY OF THE INVENTION

Objects of the Invention

An object of the present invention is that of providing a fluorescent lamp ballast for a lighting apparatus, wherein this ballast is operative to reduce the possibility of a person receiving a severe electric shock when servicing this lighting apparatus.

This as well as other objects, features and advantages of the present invention will become apparent from the following description and claims.

Brief Description

In its preferred embodiment, the present invention constitutes an electronic ballast that provides a high-frequency current-limited voltage between a first pair of socket terminals and a second pair of socket terminals. These pairs of socket terminals are adapted to receive and hold a rapid-start fluorescent lamp. The first terminal pair has a relatively low-magnitude potential relative to ground; the second terminal pair has a relatively high-magnitude potential relative to ground. A person coming in direct or indirect contact with the second terminal pair is apt to receive a hazardous electric shock.

A self-oscillating electronic inverter is operable to provide the high-frequency voltage. To provide an output, this inverter has to be triggered into oscillation. However, if no current flows to and/or from the first terminal pair, the inverter will automatically become disabled within about 25 milli-seconds; whereafter it will not be re-triggered for about 1.5 seconds.

With no current flowing, the magnitude of the high-frequency AC voltage is high enough to permit proper starting of a the rapid-start fluorescent lamp within a time span of 25 milli-seconds, but only after its cathodes have become incandescent. As soon as the lamp has started, lamp current flows between the socket terminal pairs through the fluorescent lamp.

If lamp current flowing to/from the first terminal pair fails to materialize, or if it is interrupted, as for instance may happen when replacing the fluorescent lamp, the inverter becomes disabled; which means that the electric shock hazard represented by the second terminal pair will be removed within about 25 milli-seconds, thereafter not to re-occur for about 1.5 seconds.

DESCRIPTION OF THE PREFERRED EMBODIMENT

Details of Construction

Figure 1:
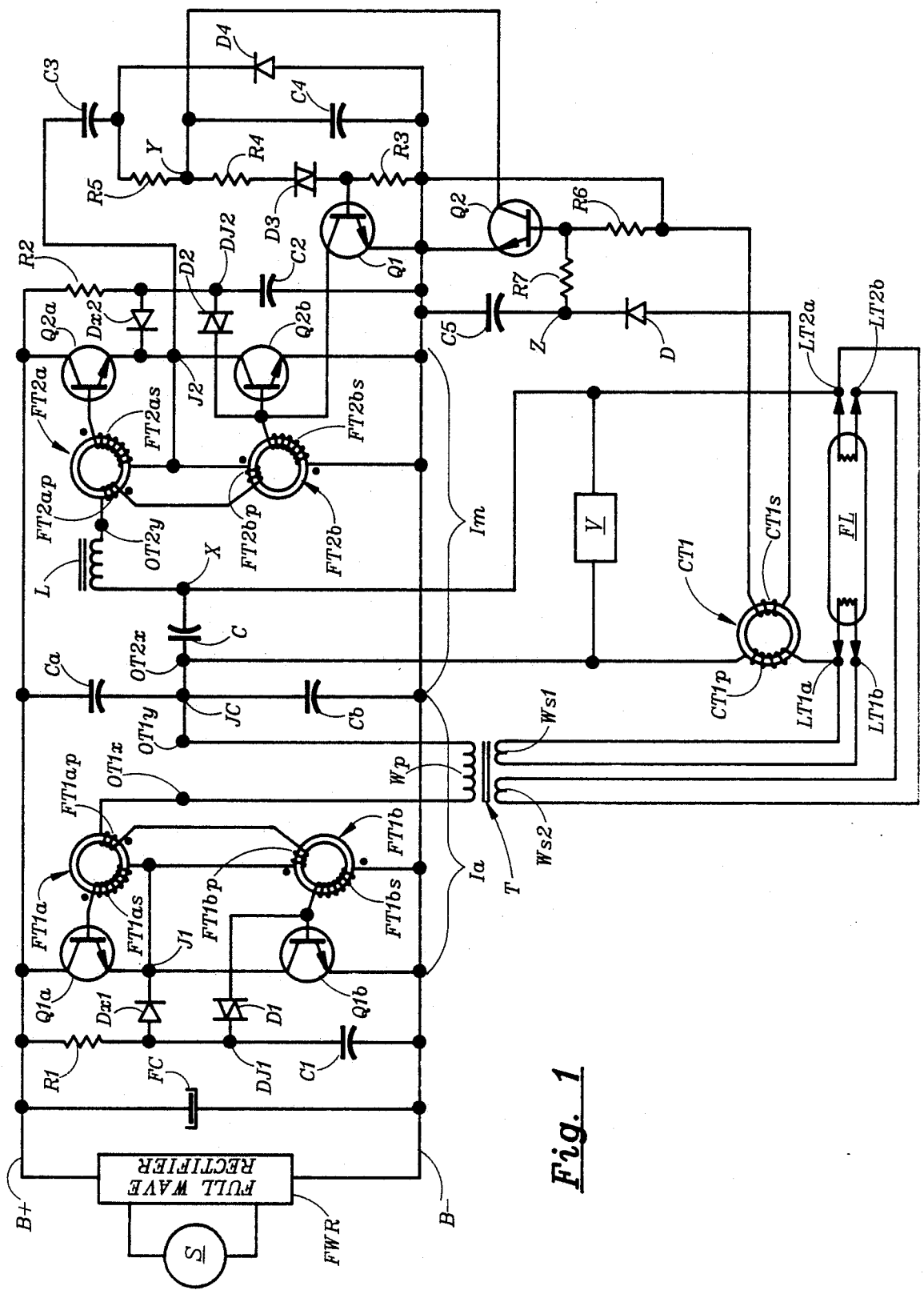
FIG. 1 illustrates the preferred embodiment of the invention and shows a first inverter operative to provide cathode heating for a fluorescent lamp, and a second inverter operative to controllably provide main operating power to the fluorescent lamp.

FIG. 1 illustrates the preferred embodiment of the invention and shows an AC voltage source S, which in reality is an ordinary 120 Volt/60 Hz electric utility power line.

Connected to S is a full-wave rectifier FWR that rectifies the AC voltage from S to provide a substantially constant-magnitude DC voltage between a positive power bus B+ and a negative power bus B−.

A first pair of transistors Q1a and Q1b are connected in series between the B+ bus and the B− bus in such a way that the collector of Q1a is connected to the B+ bus, the emitter of Q1a is connected with the collector of Q1b at a junction J1, and the emitter of Q1b is connected with the B− bus.

A second pair of transistors Q2a and Q2b are connected in series between the B+ bus and the B− bus in such a way that the collector of Q2a is connected to the B+ bus, the emitter of Q2a is connected with the collector of Q2b at a junction J2, and the emitter of Q2b is connected with the B− bus.

Primary winding FT1ap of saturable feedback transformer FT1a and primary winding FT1bp of saturable feedback transformer FT1b are connected in series between junction J1 and output terminal OT1x. Another output terminal OT1y is connected with junction JC between capacitors Ca and Cb; which capacitors are connected in series between the B+ bus and the B− bus.

Primary winding FT2ap of saturable feedback transformer FT2a and primary winding FT2bp of saturable feedback transformer FT2b are connected in series between junction J2 and output terminal OT2y. Another output terminal OT2x is connected with junction JC.

Secondary winding FT1as of feedback transformer FT1a is connected between the base and the emitter of transistor Q1a; and secondary winding FT1bs of feedback transformer FT1b is connected between the base and the emitter of transistor Q1b.

Secondary winding FT2*as* of feedback transformer FT2*a* is connected between the base and the emitter of transistor Q2*a*; and secondary winding FT2*bs* of feedback transformer FT2*b* is connected between the base and the emitter of transistor Q2*b*.

A capacitor C is connected between output terminal OT2*x* and a point X; and an inductor L is connected between point X and output terminal OT2*y*.

The assembly consisting of transistors Q1*a* and Q1*b*, feedback transformers FT1*a* and FT1*b*, and output terminals OT1*x* and OT1*y* is referred to as auxiliary inverter I*a*. The assembly consisting of transistors Q2*a* and Q2*b*, feedback transformers FT2*a* and FT2*b*, and output terminals OT2*x* and OT2*y* is referred to as main inverter I*m*.

A resistor R1 is connected between the B+ bus and a junction DJ; and a capacitor C1 is connected between junction DJ1 and the B− bus. A Diac D1 is connected between junction DJ1 and the base of transistor Q1*b*. A diode D1*x* is connected with its anode to junction DJ1 and with its cathode to junction J1.

A resistor R2 is connected between the B+ bus and a junction DJ2; and a capacitor C2 is connected between junction DJ2 and the B− bus. A Diac D2 is connected between junction DJ2 and the base of transistor Q2*b*; and a diode D×2 is connected with its anode to junction DJ2 and with its cathode to junction J2.

Primary winding Wp of transformer T is connected with inverter output terminals OT1*x* and OT1*y*. Secondary winding Ws1 of transformer T is connected with lamp terminals LT1*a* and LT1*b* of fluorescent lamp FL; and secondary winding Ws2 of transformer T is connected with lamp terminals LT2*a* and LT2*b* of FL.

Lamp terminal LT2*a* is connected with point X, and lamp terminal LT1*a* is connected with output terminal OT2*x* by way of primary winding CT1*p* of a control transformer CT1. A Varistor V is connected between point X and output terminal OT2*x*.

Secondary winding CT1*s* of control transformer CT1 is connected between the B− bus and the anode of a diode D. The cathode of diode D is connected with a point Z.

A first auxiliary transistor Q1 is connected with its collector to the base of transistor Q2*b* and with its emitter to the B− bus. A second auxiliary transistor Q2 is connected with its collector to a point Y and with its emitter to the B− bus.

A resistor R3 is connected between the base of transistor Q1 and the B− bus; and a series-combination of a Diac D and a resistor R4 is connected between point Y and the base of transistor Q1.

A capacitor C3 is connected between junction J2 and the cathode of a diode D4. The anode of diode D4 is connected with the B− bus. A resistor R5 is connected between the cathode of diode D4 and point Y; and a capacitor C4 is connected between point Y and the B− bus.

A resistor R6 is connected between the base of transistor Q2 and the B− bus; and a resistor R7 is connected between the base of transistor Q2 and point Z. A capacitor C5 is connected between point Z and the B− bus.

A filter capacitor FC is connected between the B= bus and the B− bus.

Details of Operation

The operation of the ballast arrangement of FIG. 1 may be further explained as follows.

FIG. 1 shows two half-bridge inverters: an auxiliary inverter I*a* consisting of transistors Q1*a* and Q1*b* with their respective saturable positive feedback transformers FT1*a* and FT1*b*; and a main inverter I*m* consisting of transistors Q2*a* and Q2*b* with their respective saturable positive feedback transformers FT2*a* and FT2*b*.

Both the half-bridge inverters use capacitors C*a* and C*b* to provide for an effective center-tap between the B− bus and the B+ bus—this center-tap being junction JC.

Both inverters are capable of self-oscillation by way of positive feedback. However, to oscillate, each inverter has to be triggered into oscillation. When they do oscillate, the frequency of oscillation is about 30 kHz. For further explanation of the operation of this type of inverter, reference is made to U.S. Pat. No. 4,184,128, and particularly to FIG. 8 thereof.

Inverter I*a* is triggered into oscillation a few milliseconds after application of power from source S—length of the delay being determined by the time it takes for capacitor C1 to charge to a voltage of magnitude high enough to cause Diac D1 ti break down and provide a trigger pulse to the base of transistor Q1*b*.

By way of transformer T, the output from inverter I*a* is applied to the cathodes of fluorescent lamp FL, thereby conditioning this lamp and making it ready to conduct. For a typical fluorescent lamp, this conditioning takes from 1.0 to 1.5 second, after which time the lamp cathodes have reached incandescence and are capable of adequate electron emission.

Inverter I*m* is triggered into oscillation about 1.5 seconds after initial application of power from source S. Thus, by the time inverter I*m* starts oscillating, the fluorescent lamp has become fully conditioned and is ready to start without further delay.

That is, under normal circumstances, as soon as main inverter I*m* starts to oscillate, the fluorescent lamp instantly ignites (although not in normal instant-start fashion)—having by that time been fully conditioned to conduct. However, if the lamp does not ignite, the inverter ceases to oscillate within about 25 milli-seconds—as explained hereinbelow.

Inverter I*m* can be triggered out of oscillation as well. This is accomplished by way of charging capacitor C4 to a voltage of magnitude high enough to cause Diac D3 to break down; which, in turn, provides base current to transistor Q1, thereby causing this transistor Q1 to provide a momentary short circuit between the base and the emitter of transistor Q2*b*; which short circuit momentarily removes the positive feedback, thereby causing oscillation to cease.

As soon as inverter I*m* starts to oscillate, a 30 kHz squarewave voltage appears at junction J2; which voltage is applied by way of capacitor C3 to rectifier D4. Thus, immediately after onset of oscillation of I*m*, capacitor C4 starts to charge toward the point where Diac D3 will break down. The time to reach that point is determined by the values of resistor R4 and capacitor C4, and is chosen to be about 25 milli-seconds.

Thus, by way of the arrangement comprising elements C3, D4 R5, C4, R4 and D3, inverter I*m* is made operative to squelch its own oscillation within about 25 milli-seconds after it starts. In other words, absent other factors, inverter I*m* would operate in such manner as to oscillate for a period of about 25 milli-seconds each time after having been quiescent for about 1.5 seconds.

But, since a fluorescent lamp can not reasonably operate by being powered only for 25 milli-seconds out of each 1.5 seconds, arrangements have been provided by which the otherwise automatic squelching of the oscillation is prevented from taking place as long as current flows through primary winding CT1p of current transformer CT1.

Current through primary winding CT1p causes current to flow from secondary winding CT1s, thereby (by way of diode D, capacitor C5 and resistor R6) to provide base current to transistor Q2 of such amount as to cause this transistor to become fully conductive. With transistor Q2 fully conductive, capacitor C4 is prevented from being charged; which means that the otherwise automatic squelching of the oscillation of inverter Im is prevented for as long as current is flowing through the wire connecting one side of primary winding CT1p with lamp terminal LT1a.

Thus, as long as lamp current is flowing into (or out of) lamp terminals LT1a and LT1b, inverter Im will continue to oscillate once it has started. However, if this lamp current is interupted, inverter Im will be triggered out of oscillation within about 25 milli-seconds.

Additional Comments (a) To prevent redundant triggering of inverter Ia, diode Dx1 is placed between junctions DJ1 and J1. Similarly, to prevent redundant triggering of inverter Im, diode Dx2 is placed between junctions DJ2 and J2.

In this connection, it should be noted that—by way of diode Dx2—the very oscillation of inverter Im automatically causes capacitor C2 to discharge; which implies that each time after the inverter has been stopped from oscillation, capacitor C2 has to be recharged all the way from "scratch".

(b) In some situations it may be advantageous to remove the conditioning voltage after the initial lamp conditioning has been accomplished. In particular, it may be advantageous for energy-efficiency reasons to remove the cathode heating power after the lamp has ignited.

This can be accomplished simply by making provisions for inverter Ia to be disabled as soon as lamp current flows through the primary winding CT1p of transformer CT1; which, in turn, can be accomplished very simply by placing an auxiliary transistor across the base-emitter junction of transistor Q1b in manner similar to that in which transistor Q1 is placed across the base-emitter junction of transistor Q2b, and by connecting a resistor between point Z and the base of this auxiliary transistor.

If it were to be automatically disabled in the manner suggested, inverter Ia would equally automatically re-initiate its oscillation immediately upon cessation of the flow of lamp current through primary winding CT1p.

(c) Varistor V is chosen such that it will limit the voltage developing across tank capacitor C to a magnitude that is suitable for proper lamp ignition; which voltage might be of magnitude about twice that of the lamp's normal operating voltage.

If for some reason the fluorescent lamp should not ignite, the magnitude of the voltage developing across capacitor C (as resulting from Q-multiplication) would be limited by the voltage-clamping characteristics of Varistor V.

(d) As long as power is flowing through the Varistor, the rate of power dissipation therein is very large: about twice as large as the normal full power applied to the lamp when it is operating. With this full power being typically on the order of 80 Watt for a pair of F40/T12 fluorescent lamps (which is the most commonly occurring fluorescent lamp load), the implication is that the Varistor has to be able to handle a dissipation of about 160 Watt. This amount of power dissipation is well within the limits of an ordinary inexpensive Varistor, as long as the average dissipation does not exceed about 2 Watt; which, in the present arrangement, it will not since the 80 Watt dissipation can only occur at a maximum duty-rate of 25 milli-seconds out of every 1.5 seconds (or 1500 milli-seconds).

(e) Thus, as long as any output current from inverter Im is prevented from flowing through the primary winding of control transformer CT1, the output voltage provided between terminals LT1a and LT2a will consist of intermittent pulses of 30 kHz voltage of magnitude determined by the voltage-limiting characteristics of the Varistor. These pulses will be of about 25 milli-seconds duration; and they will be spaced apart by about 1500 milli-seconds. As a result, the RMS magnitude of the voltage then provided between terminals LTia and LT2a will be reduced by the square root of the ratio between 1500 and 25, or by a factor of about 7.25, as compared to the RMS magnitude of the 30 kHz voltage simply as limited in magnitude by the Varistor.

(f) It is noted that source S, being an ordinary electric utility power line, is connected in circuit with earth ground.

(g) Output terminal OT2x, which is connected with terminal LT1a, exhibits no significant electric shock hazard to a person coming in contact therewith, even if either or both inverters are in operation, and even if that person is also in contact with earth ground. Point X, however, which is connected with terminal LT2a, does constitute a potentially significant electric shock hazard as long as inverter Im is in operation, but not otherwise. Thus, if the fluorescent lamp is removed from terminals LT1a and LT1b, inverter Im stops operation within about 25 milli-seconds, and it would thereafter not be possible to receive a serious electric shock from terminals LT2a and/or LT2b.

(h) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. A ballast comprising:
    power input means operative to be connected with the power line voltage of an ordinary electric utility power line;
    power conditioning means connected with the power input means and operative to provide a current-limited AC voltage between a first output terminal and a second output terminal;
    control means connected in circuit with the power conditioning means and operative to cause a substantial reduction in the magnitude of the AC voltage in response to a control signal;
    control signal means connected in circuit with the power conditioning means and operative in response to the AC voltage and after a relatively brief period to provide the control signal, except if provided with a prevention signal at a prevention signal input;

lamp terminal means connected with the first and second output terminals and operative to permit connection of a gas discharge lamp between the first and second terminals; and sensor means connected in circuit with the lamp terminal means and operative to provide the prevention signal to the prevention input in response to lamp current flowing through the gas discharge lamp;

whereby: (i) a gas discharge lamp may be properly powered from the current-limited AC voltage provided between the first and second output terminals as long as lamp current results in response to this AC voltage within the relatively brief period, and (ii) the AC voltage exhibits a substantial reduction in magnitude in the event that no lamp current results within the relatively brief period.

2. The ballast of claim 1 wherein: (i) the power conditioning means comprises frequency converter means, and (ii) the frequency of the AC voltage is substantially higher than that of the power line voltage.

3. The ballast of claim 1 wherein: (i) the voltage between earth ground and the first output terminal is of relatively low magnitude, (ii) the voltage between earth ground and the second output terminal is of relatively high magnitude, and (iii) the sensor means is responsive to current flowing from the first terminal, but substantially non-responsive to current flowing from the second terminal means.

4. An arrangement comprising:
a source providing an AC voltage between a first output terminal and a second output terminal, the first output terminal having a relatively low-magnitude potential to earth ground, the second terminal having a relatively high-magnitude potential to earth ground, the nature of the relatively high-magnitude potential being: (i) such as to pose an electric shock hazard to a person coming in contact therewith, (ii) controllable such as to reduce the electric shock hazard by way of providing a control signal to a control terminal means;

control means connected with the control terminal means and operative to provide the control signal thereto after the relatively high-magnitude potential has existed at the second output terminal for longer than a relatively brief period of time, except if provided with a negate-signal at a negate control input; and sensor means connected in circuit between the first output terminal and the negate terminal, the sensor means being operative to sense the presence of current flowing from the first output terminal and to provide the negate-signal in response thereto.

5. An arrangement comprising:
controllable source means conditionally operable to provide an output voltage between a first output terminal and a second output terminal, the first output terminal representing substantially no electric shock hazard to a person coming in contact therewith if that person also is in contact with earth ground, the second output terminal representing an electric shock hazard to a person coming in contact therewith if that person also is in contact with earth ground while the output voltage is present, the source means having control input means operative on receipt of a control signal to reduce the electric shock hazard associated with the second output terminal; and control means connected in circuit with the first output terminal and the control input means, the control means being responsive to current flowing from the first output terminal and operative to provide the control signal in the event that current flowing from the first output terminal has been absent for longer than a brief period of time.

6. The arrangement of claim 5 wherein the brief period of time is on the order of 25 milli-seconds.

7. A ballast for a fluorescent lamp, comprising:
source means having control input means adapted to receive a control signal and being operable to provide a current-limited output voltage between a first terminal and a second terminal, the output voltage existing in either of two states: (i) a first state in which the RMS magnitude of the output voltage is relatively large, the first state resulting when a control signal is received by the control input means, and (ii) a second state in which the RMS magnitude of the output voltage is relatively low, the second state resulting after a brief delay when a control signal is not received by the control input means;

control means connected in circuit with the first terminal and with the control input means, the control means being operative to sense any current flowing from the first terminal and to provide a control signal to the control input means substantially for as long as current is indeed flowing from the first terminal; and lamp socket means connected with the output terminals and adapted to receive and hold a fluorescent lamp.

8. The ballast of claim 7 wherein, while existing in its second state, the output voltage is characterized by comprising intermittent brief periods of relatively high-magnitude voltage, each such brief period being separated from the next following brief period by a not-so-brief period of relatively low-magnitude voltage.

9. The ballast of claim 8 wherein the not-so-brief period is longer than the brief period by a factor of about two or more.

10. The ballast of claim 9 wherein: (i) each brief period has a duration on the order of 25 milli-seconds, and (ii) each not-so-brief period has a duration on the order of 1.5 seconds.

11. The ballast of claim 8 combined with a pre-conditioning means and wherein: (i) the fluorescent lamp has thermionic cathodes, (ii) the thermionic cathodes have to be pre-conditioned before the lamp will operate, and (iii) the pre-conditioning means is operative to pre-condition the cathodes.

12. The ballast of claim 7 wherein the control means ceases to provide a control signal to the control input means within a very brief period after current ceases to flow from the first terminal.

13. The ballast of claim 12 wherein the brief delay is on the order of 25 milli-seconds in duration.

14. An electronic ballast for a fluorescent lamp, comprising:
rectifier means operative to connect with the power line voltage of an ordinary electric utility power line and to provide a DC voltage to a DC terminal means;

inverter means connected with the DC terminal means and operable, after the receipt of a trigger signal, to provide an AC voltage between a first output terminal and a second output terminal, the inverter means having a disable input means operative on receipt of a disable signal to disable the inverter means and thereby to remove the AC voltage from the output terminals;

disable means connected in circuit with the DC terminal means and the disable input means, the disable means having a negate input means and being operative after a brief delay to supply a disable signal to the disable input means except if receiving a negate signal at the negate input means;

lamp holder means connected with the first and second output terminals and operative to receive and hold a fluorescent lamp; and negate means connected in circuit with the first output terminal and the negate input means, the negate means being operative to sense the presence of current flowing from the first output terminal and to provide a negate signal in response thereto;

whereby the AC voltage is removed except if current flows from the first output terminal within a brief period of time, the brief period of time being shorter than the length of the brief delay.

15. The electronic ballast of claim 14 combined with a cathode power supply means and wherein: (i) the fluorescent lamp has thermionic cathodes, (ii) the magnitude of the AC voltage between the output terminals is inadequate to ignite the fluorescent lamp except after the cathodes have become incandescent, and (iii) the cathode power supply means is operative to supply heating power to the cathodes independent of the presence of the AC voltage between the output terminals.

16. The electronic ballast of claim 14 wherein the duration of the brief delay is on the order of 25 milliseconds.

17. The electronic ballast of claim 14 wherein a voltage-limiting means is effectively connected between the output terminals, the voltage-limiting means being operative to limit the magnitude of the AC voltage between the output terminals to a level appropriate for effective starting of the fluorescent lamp.

18. The electronic ballast of claim 14 wherein, whenever the AC voltage is present between the output terminals: (i) the second output terminal exhibits a relatively high-magnitude potential with respect to earth ground, therefore representing a potentially serious electric shock hazard to a person in contact therewith, and (ii) the first output terminal exhibits a relatively low-magnitude potential with respect to earth ground, therefore representing no potentially serious electric shock hazard to a person in contact therewith.

19. The electronic ballast of claim 18 wherein the potentially serious electric shock hazard is removed whenever the AC voltage is removed from the output terminals.

20. The electronic ballast of claim 14 wherein, whenever the AC voltage is removed from the output terminals by action of the disable means, it will automatically be re-provided after a period of time, the period of time being substantially longer that the length of the brief delay.

21. A combination comprising:
an AC current source powered from a DC voltage and operable, except after having been provided with a disable signal at a set of disable terminals, to provide an AC output current from a pair of output terminals;

gas discharge lamp connected with the output terminals and normally operative to constitute an adequate load for the AC current source, thereby to cause the magnitude of the voltage across the output terminals to stay below a first level for as long as the lamp is indeed so operative;

voltage-limiting means effectively connected across the output terminals and operative, in case the lamp were to fail to constitute said adequate load, to prevent the magnitude of the voltage between the output terminals from exceeding a second level, the second level being: (i) higher than the first level, and (ii) substantially independent of the magnitude of the DC voltage; and control means connected in circuit between the output terminals and the disable terminals, the control means being operative: (i) to sense the presence of the AC output current when it is flowing through the lamp, and (ii) to provide said disable signal in case the AC output current were to fail to flow through the lamp for longer than a brief period of time;

thereby to prevent the voltage-limiting means from having to absorb power for longer than this brief period.

22. The combination of claim 21 wherein the voltage-limiting means comprises a non-linear resistance means.

23. The combination of claim 22 wherein the voltage-limiting means comprises a Varistor.

24. The combination of claim 21 wherein substantially no current flows through the voltage-limiting means as long as the magnitude of the voltage across the output terminals remains below said first level.

25. The combination of claim 21 and means operative to cause the AC current source, after having been disabled for longer than a certain period of time, to resume supplying the AC output current.

26. The combination of claim 25 wherein the duration of the brief period is on the order of 25 milli-seconds and that of the certain period is on the order of one second or more.

27. A combination comprising:
an AC current source powered from a DC voltage and operable, except for a certain period of time after having been provided with a disable signal at a set of disable terminals, to provide an AC output current from a pair of output terminals;

gas discharge lamp connected with the output terminals and normally operative to constitute an adequate load for the AC current source, thereby to cause the magnitude of the voltage across the output terminals to stay below a first level for as long as the lamp is indeed so operative;

voltage-limiting means effectively connected across the output terminals and operative, in case the lamp were to fail to constitute said adequate load, to prevent the magnitude of the voltage between the output terminals from exceeding a second level, the second level being: (i) higher than the first level, and (ii) substantially independent of the magnitude of the DC voltage; and control means connected in circuit between the output terminals and the disable terminals, and operative to provide said disable signal in case the gas discharge lamp were to fail to constitute said adequate load and AC output current were to flow through the voltage-limiting means for longer than a brief period of time;

thereby to prevent the voltage-limiting means from having to absorb power for longer than this brief period.

28. A combination comprising:

an AC current source powered from a DC voltage and operable, except for a certain period of time after having been provided with a disable signal at a set of disable terminals, to provide an AC output current from a pair of output terminals;

gas discharge lamp connected with the output terminals and normally operative to constitute an adequate load for the AC current source, thereby normally to permit the AC output current to flow through the lamp without causing the magnitude of the voltage across the output terminals to exceed a first level;

voltage-limiting means effectively connected across the output terminals and operative, in case the lamp were to fail to constitute said adequate load, to prevent the magnitude of the voltage between the output terminals from exceeding a second level, the second level being: (i) higher than the first level, and (ii) substantially independent of the magnitude of the DC voltage; and control means connected in circuit between the output terminals and the disable terminals, and operative to provide said disable signal in case the AC output current were to flow through the voltage-limiting means, rather than through the lamp, for longer than a brief period of time.

* * * * *